Jan. 8, 1935. D. P. MOORE 1,987,347

METALLIC BIRD BOX OR HOUSE

Filed Aug. 25, 1932

INVENTOR.

UNITED STATES PATENT OFFICE 1,987,347

METALLIC BIRD BOX OR HOUSE

David Pelton Moore, Avon Park, Fla.

Application August 25, 1932, Serial No. 630,401

2 Claims. (Cl. 119—23)

The present invention relates to improvements in metallic bird boxes or houses, the present application being a continuation in part of my application filed January 15th, 1931, Serial No. 509,024, one object of the invention being the provision of a box or house having a removable friction disk member or plug provided with an aperture that forms the bird inlet or adit opening while the metal forming the opening is excised and bent outwardly to provide tabs or projections that constitute perches for the birds and finger grips for the individual when inserting or removing the plug.

Another object of the present invention is the provision of a metallic bird box or house, in which a friction plug constitutes the closure for one end of the same, as well as a means for permitting the cleaning out of the old nesting material and making ready for a new nest for the next season, the opening for the plug being of sufficient size to permit the use of the hand.

Still another object of this invention is the provision of a metallic bird box or house having a removable friction plug, which in turn is provided with a substantially H-shaped incision, which provides when excised a bird perch and marquise for the adit opening which is formed in the plug when the perch and marquise are formed.

Still another object of the present invention is the provision of a metallic bird box or house, which is simple, durable and inexpensive in construction and thoroughly efficient and practical in use, and which when properly painted or ornamented and installed in place is not unsightly.

In the accompanying drawing:—

Figure 1:
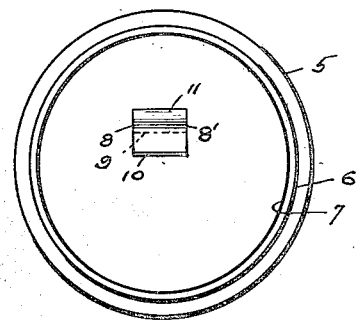
Figure 1 is a front view of the box or house, the perch and marquise being excised, with a dotted line indicating the parting line between the two before excising.
Figure 2:
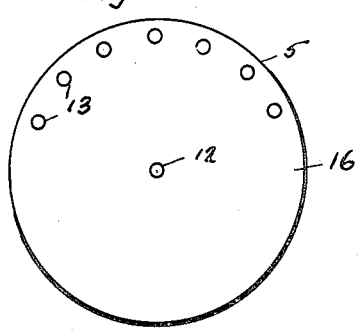
Figure 2 is a rear view.
Figure 3:
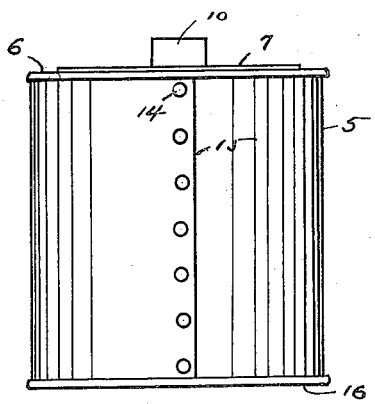
Figure 3 is a bottom view.

Referring to the drawing, and more particularly to Figs. 1, 2 and 3, the numeral 5 designates the box or house proper, here shown as a hollow cylindrical metallic member, although it is to be understood that it may be square, hexagonal or any desired shape. A rim 6 provides an opening at the front to receive a friction plug or circular disk 7, the abutting portions when in use being greased, to permit easy insertion and withdrawal of the plug, and also preventing rust at the junction. Two parallel cuts 8—8', and a cross cut 9, are provided in the plug 7 at a point slightly above the center, these cuts assuming an H-shape, and permitting the lower portion below the cut 9 and between the cuts 8—8' when excised and bent outwardly to provide a perch and finger tab 10, while that portion above the cut 9 and between the remaining portions of the cuts 8—8', when excised and bent outwardly forms an overhang or marquise 11, which assumes a position at less than a right angle to the plane of the plug, the excising of both perch and marquise providing an adit opening. The plug and its receiving opening is of a size in a quart size nest or box, to permit of the easy insertion of the hand of an average sized person, so that when desirable, the old nesting material within the chamber may be removed, and if desired, the box disinfected by spraying before the plug is again lubricated and inserted.

The rear wall 16 is provided with a central opening 12, designed to receive a screw with a washer, it having been found in practice that both the screw and washer should be non-corrosive, such as copper and/or brass, the screw with the washer being inserted from within the box and screwed to attach the box to any desired support, as a tree limb, post, or house. There is also provided a series of ventilating openings 13, here shown as arranged in an arc of a circle the center of which is the center of the opening 12.

In order to properly drain and thus keep the box dry, should any water enter the same, there is provided along the bottom a series of openings 14, which are here shown as paralleling the seam 15.

Figure 4:
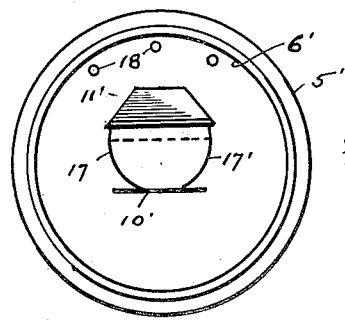
Figure 4 is a front view of a modified form of bird box or house.

In the construction shown in Fig. 4, the box proper 5', is similar to the box 5 heretofore described, the plug 6', being provided with the two arc-shaped cuts 17—17', by means of which the perch or finger tab 10' and the marquise 11', are formed, the plug before the two are excised, having a modified H-shape incision. Ventilating apertures 18 are here shown, as being provided in the plug. In this manner with the rear openings as heretofore set forth, a properly aired and ventilated metallic bird box or house is provided.

These boxes or houses when ready for use are painted exteriorly and lacquered within, so as to withstand the elements, and to conveniently ship the same by mail or parcel post, three different sized boxes are nested, it having been found in practice that the opening in the gallon size box will receive and enclose a half-gallon size box, which will in turn receive and enclose a quart size box.

In practice, the adit opening in the quart size is made of a size for the house wren and similar sized birds, the half gallon sized one for sparrows, and blue birds, and the gallon sized box for black martins and the like. Also where used with gregarious birds such as black martins, a square post can be used, with corners in certain places squared, so that at least twelve gallon-sized boxes can be disposed, eight upon the flat faces in two widely spaced tiers, while four are attached to the squared corners in between the said tiers.

These boxes therefore provide a safety nesting place against varmints, snakes and cats, as they offer no firm holding portions, and being made of metal, squirrels cannot cut the edges of the adit openings to get into the nesting chambers, thereby insuring the same size openings from one season to the next and excluding the larger sized birds from the smaller boxes.

When putting these bird boxes in place for use by the birds, the rim of the clean-out opening and/or the edge of the plug which engages such rim has applied thereto a hard grease such as that which is used in motors. By this means rust is prevented at these parts, and water is prevented from entering at the joint to cause rust.

Thus the life of the bird box is increased, and the plug is easily and quickly removed to permit removal of the old nesting material, and the re-lubricating and inserting of the plug.

Thus it will be seen that a quickly installed, sanitary, inexpensive and durable metal bird box or house is provided and one that when properly installed is taken to by the birds, as the box or house is ventilated and aired so as to provide comfort for the parent and baby birds during the hottest weather, something not heretofore accomplished by a metal bird box.

What is claimed, is:—

1. A circular cleanout plug for bird boxes in which a bird adit opening is formed by an H-shaped incision to permit the metal between the long sides of the incision to be bent outwardly to form a perch and a marquise respectively.

2. A bird box including a metallic chambered member having a large opening in one end and a central opening in the opposite end, there being a plurality of ventilating openings in the latter end, and a plug for the large opening provided with a bird adit opening formed by an H-shaped incision, the metal released by the incision being excised in opposite directions to form a perch and a marquise respectively.

DAVID PELTON MOORE.